United States Patent [19]
Sharp

[11] 3,756,707
[45] Sept. 4, 1973

[54] PHOTOGRAPHIC FILM HANDLING CASSETTE

[75] Inventor: John R. Sharp, Squantum, Mass.

[73] Assignee: Polaroid Corporation, Cambridge, Mass.

[22] Filed: Jan. 3, 1972

[21] Appl. No.: 214,548

[52] U.S. Cl................ 352/130, 352/78, 352/159, 242/195
[51] Int. Cl. ............................................. G03d 3/00
[58] Field of Search................. 352/72, 78, 130, 352/157, 158, 159; 226/25, 180, 195

[56] References Cited
UNITED STATES PATENTS

| | | | |
|---|---|---|---|
| 3,656,674 | 4/1972 | Morse | 226/25 |
| 3,643,891 | 2/1972 | Isbell | 352/72 X |
| 3,589,807 | 6/1971 | Penfield | 242/75.3 X |
| 3,643,579 | 2/1972 | Downey | 352/78 R X |
| 2,172,235 | 9/1939 | Aldinger | 352/159 |
| 3,640,438 | 2/1972 | Morse | 226/25 |
| 3,065,890 | 11/1962 | Fox | 352/159 X |
| 3,294,302 | 12/1966 | Floden | 352/159 X |
| 3,547,331 | 12/1970 | Hereford | 352/159 X |
| 3,608,808 | 9/1971 | Wolf | 226/195 |
| 3,268,287 | 8/1966 | Nemeth | 352/159 X |

FOREIGN PATENTS OR APPLICATIONS
197,686   5/1958   Germany.......................... 352/78 R Primary Examiner—Samuel S. Matthews
Assistant Examiner—Alan Mathews
Attorney—John S. Vale

[57] ABSTRACT

A multi-purpose film handling cassette adapted for use with a motion picture camera and projector of the type including a film transport mechanism for progressively transporting an incremental section of a film strip, stored on a supply reel within the cassette, past a cassette exposure and projection station. The cassette is provided with a film tension regulator for establishing a feed loop of film strip between the supply reel and the exposure and projection station to isolate that portion of the film strip near the exposure and projection station from the inertial drag of the supply reel thereby preventing the film transport mechanism from applying excessive pressure to the film strip. The tension regulator is also configured to guide the film strip onto the supply reel in a manner which precludes disturbing a coating of liquid processing composition applied to the film strip during a processing mode of operation.

33 Claims, 6 Drawing Figures

FIG. 1

PHOTOGRAPHIC FILM HANDLING CASSETTE

BACKGROUND OF THE INVENTION

1. Field of the Invention

The present invention relates to the field of photography and, more particularly, to a multi-purpose film handling cassette including a film strip tension regulating member.

2. Description of the Prior Art

Recently, self-developing film handling systems have been developed which feature a multi-purpose film handling cassette which may be mounted in a motion picture camera for exposing a film strip contained therein and then may be immediately transferred to a motion picture projector for processing and projecting the film strip without having to remove it from the cassette.

The cassette includes a combination exposure and projection station past which incremental sections of the film strip may be progressively transported by film transport mechanism mounted in the cmaera and projector. Typically, the film strip is stored on supply and take-up reels within the cassette and includes sprocket holes which may be engaged by a reciprocally driven claw mechanism for advancing the film from the supply reel to the exposure and projection station.

Processing is accomplished by transporting the exposed film strip past a cassette processing station during its initial rewind from the take-up reel to the supply reel where a thin coating of liquid processing composition is applied to the film strip to develop latent images formed in its photosensitive emulsion.

Exemplary of such self-developing systems are those described in U.S. Pat. No. 3,615,127 issued to Edwin H. Land on Oct. 26, 1971; U.S. Pat. No. 3,597,065 issued to Rogers B. Downey on Aug. 3, 1971; and U.S. Pat. No. 3,537,784 issued to Rogers B. Downey on Nov. 3, 1970; all of which are assigned to the same assignee as the present invention.

It is desirable to provide such multi-purpose film handling cassettes with a film strip tension regulating device for establishing a feed loop of film strip between the supply reel and combination exposure and projection station. The function of the feed loop is to isolate that portion of the film strip which is engaged by the claw mechanism near the exposure and projection station from the tension induced in the film strip by the inertia of the supply reel thereby preventing the claw mechanism from applying excessive pressure to the sprocket holes and assuring smooth transport of an incremental section of the film strip to its exposure or projection portion. It is also preferable that the tension regulator be configured to guide the liquid treated film strip onto the supply reel during the processing mode of operation.

In designing a tension regulator suitable for incorporation into a multi-purpose film handling cassette, consideration must be given to such special requirements as the performance of the regulator during the processing mode of operation and space limitations within the cassette housing for accommodating the regulator.

During the processing mode of operation, the exposed film strip is transported past the processing station at a fairly rapid rate to insure that the liquid processing composition is applied uniformly. Typically, a 50 foot length of film strip may be coated in approximately 10 seconds. It is during this rapid rewind that tension within the film strip builds up to a maximum. Therefore, the regulator and its mounting must be designed to endure significant stress levels and yet remain stable so as not to disturb the liquid processing composition during rewind.

The limitation on space within the cassette housing is imposed by the processing station which is preferably located between the supply reel and the combination exposure and projection station. Therefore, it is desirable to provide a tension regulator which is compact and may be readily mounted in a relatively small space.

In terms of manufacturability and economics, it is also preferable that the tension regulator be designed to lend itself to molded plastic construction and automated assembly and mounting techniques.

The prior art discloses a number of film handling cassettes including film tension regulators which typically take the form of spring biased idlers or elongated leaf springs. The regulators are mounted for movement between initial and energized positions by the advancing film strip to repeatedly form a feed loop of film strip between the supply reel and the cassette exposure or projection station. Examples of these prior art film handling cassettes may be found in U.S. Pat. Nos. 2,119,375 and 2,159,998.

Generally, the type of tension regulators disclosed in the above mentioned U.S. Patents have characteristics which limit their suitability for incorporation into a multi-purpose self developing film handling cassette. For example, the leaf spring regulators are relatively long and the amount of space required within the cassette housing for its movement between initial and energized positions is excessive. Neither type of regulator is well suited for processing operations since they are not equipped with means for stabilizing the regulator during rapid rewind nor do they include provisions for engaging a liquid coated film strip in a manner which would preclude disturbing the coating. Furthermore, both types of regulators do not lend themselves to molded plastic construction and automated assembly since they obviously utilize metal springs and are adapted to be secured to the cassette housing with conventional fasteners such as screws and rivets.

SUMMARY OF THE INVENTION

The present invention relates to a multi-purpose film handling cassette that is provided with a compact tension regulator which in its preferred form lends itself to molded plastic construction and automated assembly and mounting within the cassettes.

Preferably, the tension regulator includes a pivot arm having an integrally formed roller bearing near one end, a roller mounted on the roller bearing around which the film strip is adapted to pass, an integrally formed mounting bearing near the opposite end of the pivot arm, and an integrally formed resilient blade extending from the mounting bearing at an acute angle to the pivot arm towards the roller bearing. The cassette housing, which is also preferably formed of a plastic material, includes an integrally formed pivot arm mounting post for receiving the pivot arm mounting bearing, a first stop against which the resilient blade is positioned to locate the tension regulator in its initial position, and a second stop against which the pivot arm may be positioned to locate the tension regulator in a stabilized terminal position.

During exposure and projection modes of operation, the regulator is initially positioned such that the roller supports a portion of the film strip in position to form a feed loop between the cassette supply reel and combination exposure and projection station. As a length of film strip is advanced from the feed loop to the exposure and projection station, the length of the feed loop decreases causing the film strip to deflect the pivot arm against the bias of the resilient blade from the initial position to an energized position. While the film strip is held at its exposure or projection position, the energy stored in the resilient blade causes the pivot arm to return to its initial position thereby causing the roller to replenish the feed loop by drawing a length of film strip from the supply reel.

During the rapid rewind processing operation, the relatively high tension in the film strip deflects the tension regulator from its initial position to a terminal position wherein the pivot arm bears against the second stop thereby stabilizing the tension regulator such that the roller may guide the liquid coated film strip onto the supply reel without disturbing the coating. The hub section of the roller is also configured to include a recessed portion such that the film strip may pass around the roller with the liquid coating facing inwardly toward the roller hub.

Therefore it is an object of the present invention to provide a multi-purpose film handling cassette including a film strip tension regulator which is adapted to form a feed loop of film strip intermediate the cassette supply reel and combination exposure and projection station to facilitate film exposure and projection operations and is configured to serve as a stabilized guide for guiding a liquid treated film strip onto the supply reel to facilitate film processing operations.

It is another object of the present invention to provide a multi-purpose film handling cassette of the aforementioned type having a compact film strip tension regulator which lends itself to molded plastic construction and automated assembly and mounting within the cassette.

It is yet another object of the present invention to provide a multi-purpose film handling cassette including a housing, a film strip stored on a reel within the housing, means providing access for light rays to be directed towards an incremental section of the film strip as the film strip is progressively transported past the access means in a first direction for exposure or projection, a processing station past which the film strip may be progressively transported in a second direction for coating the film strip with a liquid processing composition, and a tension regulator which is configured for reciprocating movement between initial and energized positions in respone to progressively transporting the film strip in the first direction for continuously forming a feed loop of film strip and is also configured for movement from the initial position to a stabilized terminal position in response to progressively transporting the film strip in the second direction for guiding the liquid coated film strip onto the reel.

It is another object of the invention to provide a film strip tension regulating system adapted to be engaged by a film strip to exert a first maximum amount of force thereon during first film handling operations in which the film strip is progressively advanced therepast and a second amount of force greater than the first maximum amount of force during second film handling operations in which the film strip is progressively advanced therepast.

Another object of the invention is to provide an improved film strip tension regulating device which includes an arm mounted for movement between initial and energized positions, a roller rotatably mounted on the arm and around which a film strip is adapted to pass and a resilient blade for biasing the arm to its initial position.

Other objects of the invention will in part be obvious and will in part appear hereinafter.

BRIEF DESCRIPTION OF THE DRAWINGS

For a fuller understanding of the nature and objects of the invention, reference should be had to the following detailed description taken in connection with the accompanying drawings wherein.

DESCRIPTION OF THE PREFERRED EMBODIMENT

A preferred embodiment of this invention is illustrated as applying a compatible processing fluid to a film structure which comprises both a photosensitive image recording layer and an image receiving layer in which a visible image may be formed by image forming substances transferred by diffusion from the photosensitive layer without necessitating the subsequent removal of the processed photosensitive layer. This highly desirable type of film structure is made possible by a developed negative image having low covering power.

In typical silver halide diffusion transfer-reversal processes for the production of black and white images, a silver halide developer and a silver halide solvent are applied in an aqueous alkaline solution to a photo exposed silver halide stratum or emulsion where they develop exposed silver halide to silver and react with unreduced silver halide to form a soluble silver complex. This complex, in order to form a positive print, is transferred and reduced to silver on a silver receptive stratum on which the silver halide stratum has been superposed. It has generally been the practice, in the completion of this process, to separate the silver receptive and silver halide strata in order to render the positive image visible, particularly when it is to be viewed in transmitted light.

However, as indicated above, the positive print may be rendered visible without separation of the silver halide and silver receptive strata. For example, the silver receptive stratum may be so constituted as to provide an unusually vigorous silver precipitating environment which causes the silver to deposit upon it, in comparison with silver developed in the silver halide stratum, to possess very high covering power, i.e., opacity for a given mass of reduced silver. If the silver halide is in such a concentration as to give rise when fully developed to a predetermined low maximum density, and if the silver complex is reduced to silver in a vigorous silver precipitating environment, the resulting negative and positive images in superposition provide a composite that represents a good positive image for projection purposes as long as the images are carried on a light-transmitting support. Since the silver halide stratum and the silver receptive stratum need not be separated, a simplification of the overall silver halide diffusion transfer-reversal process is achieved.

A composite film assembly of this type as well as processing compositions for producing a stable black and white image which can be viewed by transmitting light without the necessity of removing the processed, negative image containing photosensitive layer are shown in prior U.S. Pat. No. 2,861,885 of Edwin H. Land and which issued on Nov. 25, 1958. Other composite film assemblies capable of producing photographic records which can be exhibited in full color without the necessity of removing the processed photosensitive layer as shown in prior U.S. Pats. of Edwin H. Land, No. 2,726,154, issued Dec. 6, 1955 and No. 2,944,894, issued July 12, 1960. All of these prior patents are assigned to the same assignee of the present invention.

However, it should be noted that the present invention is not directed to the chemistry by which visible images are formed in an exposed photosensitive material and/or formed in an image receiving stratum associated therewith. While an illustrative preferred embodiment of the invention is shown applying a compatible processing fluid to a film structure not requiring the removal of the photosensitive layer after visible image formation is completed, the invention itself is also applicable for use with other types of processing fluids and film structures.

Figure 1:
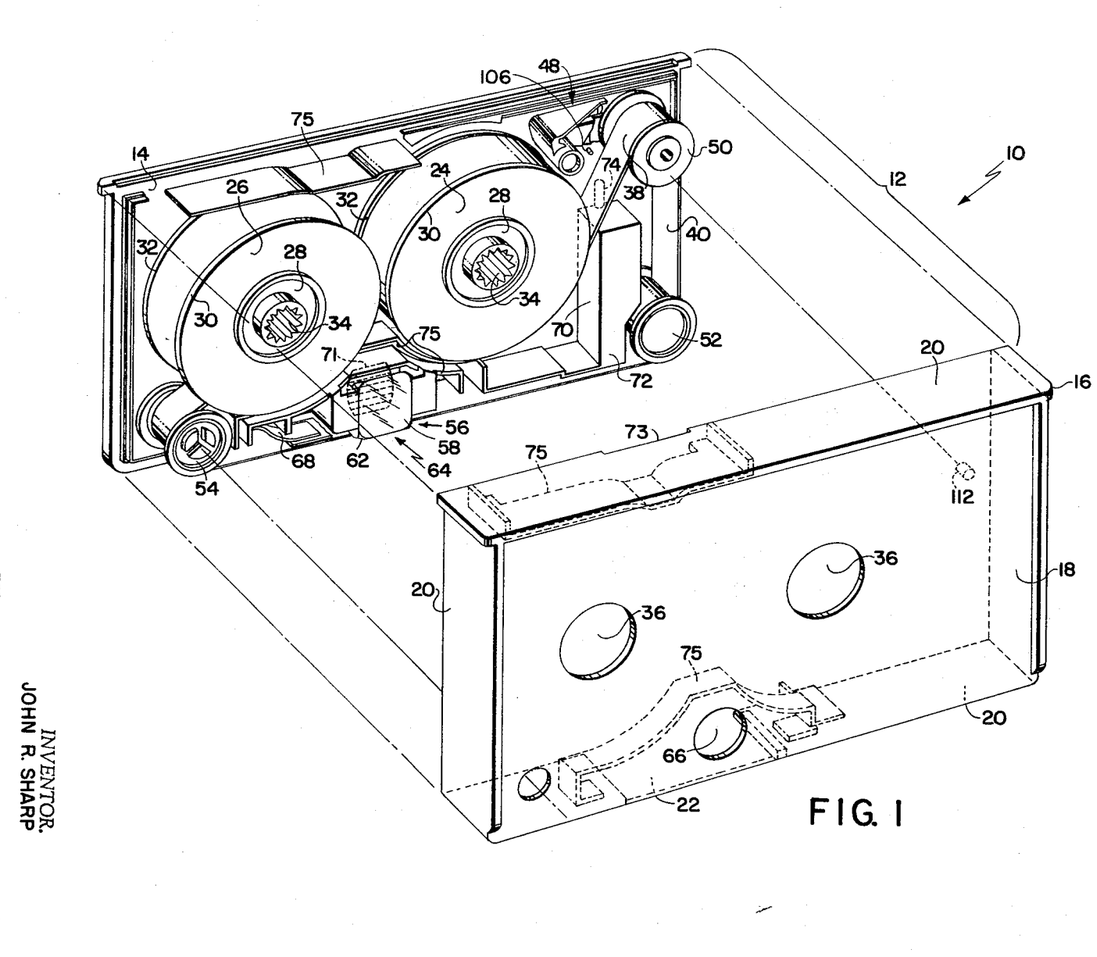
FIG. 1 is an exploded perspective view of a multipurpose film handling cassette embodying the instant invention showing the arrangement of its component parts within the cassette housing.

Referring now to FIG. 1 of drawings, a multipurpose film handling cassette is generally shown at 10. Cassette 10 includes a substantially rectangular parallelepiped shaped housing 12 formed of any suitable opaque material, for example, a thermoplastic such as polystyrene. As best shown in FIG. 1, housing 12 includes a generally rectangular base section or side wall 14 for supporting various cassette compounds and a mating cover 16 for enclosing those components. Cover 16 includes a generally rectangular side wall 18 and an integrally formed peripheral wall 20 which serves to space side walls 14 and 18 in parallel relation to one another. A generally rectangular opening 22 is provided in peripheral wall 20 and serves as a film gate for providing access to the film strip during exposure and projection modes of operation. Thus, cassette 10 is provided with means for providing access for image carrying light rays to an incremental section of the film strip to facilitate film exposure operations and means for providing access for light rays from an externally mounted projection lamp to be directed through an incremental section of the film strip to facilitate film projection operations.

A supply reel 24 and a take-up reel 26 are rotatably mounted on a pair of axles (not shown) integrally formed with side wall 14 and disposed such that reels 24 and 26 may be located in side by side coplanar relation with their respective axes of rotation substantially normal to side walls 14 and 18. Reels 24 and 26 are of the conventional type and include a central hub section 28, top and bottom guide flanges 30 and 32 extending radially from hub section 28, and a central recess 34 accessible through holes 36 in cover 16 for receiving appropriate reel drive shafts mounted in both the motion picture camera and projector.

Figures 2, 3, 4, 5, 6:
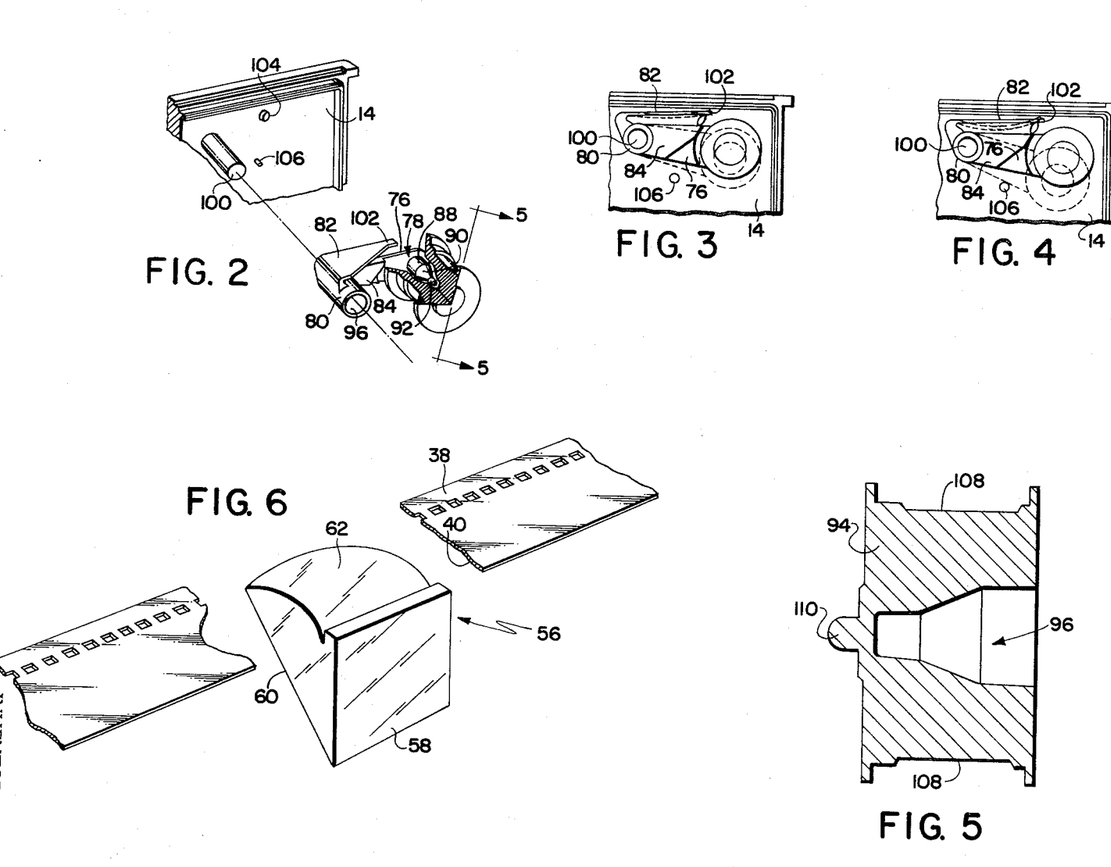
FIG. 2 is an exploded perspective view, partly in section, of the film strip tension regulator and means for mounting the tension regulator on a wall of the cassette housing.
FIG. 3 is an elevational view of a section of the cassette housing showing the tension regulator in its initial position in solid lines and its energized position in dotted lines.
FIG. 4 is an elevational view of a section of the cassette housing showing the tension regulator in its initial position in solid lines and its stabilized terminal position in dotted lines.
FIG. 5 is an enlarged cross-sectional view of the tension regulator roller taken along line 5—5 of FIG. 2.
FIG. 6 is a perspective view of a light-reflecting prismatic lens associated with the multi-purpose lens and a portion of a film strip adapted to be projected by light transmitted through the lens.

Having one end thereof attached to the hub section 28 of supply reel 24 and the opposite end thereof attached to the hub section 28 of take-up reel 26 is a length of unexposed photographic film strip 38. film strip 38 is of the type previously described and includes a photosensitive emulsion 40 on one side and a series of sprocket holes 42 adjacent one lateral edge, as best shown in FIG. 6, which are adapted to be engaged by claw transport mechanisms positioned in the camera and projector to extend through opening 22.

Initially, substantially the entire length of the unexposed film strip 38 is stored on supply reel 24 with its photosensitive emulsion side 40 facing outwardly away from hub section 28. The means for establishing a path of travel for film strip 38 from the supply reel 24 past opening 22 to the take-up reel 26 include a tension regulator 48 (to be described hereinafter) formed in part by a roller or idler 50 positioned near a first corner of housing 12, and rollers or idlers 52 and 54 positioned near the next two successive corners of housing 12, respectively, on opposite sides of opening 22 in peripheral wall 20. It will be noted that film strip 38 passes around rollers 50, 52, and 54 with emulsion side 40 facing inwardly towards the roller hubs such that film trip 38 is presented at opening 22 with emulsion side 40 facing inwardly towards the interior of cassette housing 12. Preferably, during transport of the film strip from supply reel 24 to take-up reel 26, the take-up reel 26 is driven in a counterclockwise direction (as viewed in FIG. 1) such that the film strip 38 may also be stored on the take-up reel 26 with its emulsion side 40 facing outwardly from hub section 28.

To facilitate projection of film strip 38 at opening 22, cassette 10 is provided with a light-reflecting element which in the preferred embodiment may take the form of a molded plastic prismatic lens 56. As best shown in FIG. 6, prismatic lens 56 includes a substantially flat, transparent, light receiving surface 58 and a substantially flat reflecting surface 60 which reflects light, transmitted into lens 56 through surface 58, outwardly through convex transparent surface 62 onto an incremental section of film strip 38 positioned at opening 22. A prismatic lens of this type suitable for use in connection with the present invention is described in co-pending application Ser. No. 214,591, filed on even date herewith by Philip G. Baker and is assigned to the same assignee as the present invention.

As best seen in FIG. 1, prismatic lens is adapted to be mounted on side wall 14 intermediate idlers 52 and 54 such that surface 62 is in alignment with openings 22 to form a combination exposure and projection station 64 therebetween. Also, light receiving surface 58 is aligned with an opening 66 in cover 16 through which light from a projector lamp is directed for transmission into lens 56. It will also be noted that cassette 10 may be provided with a spring biased film pressure plate 68 which is adapted to cooperate with camera and projector aperture plates for accurately locating film strip 38 with respect to station 64.

As noted earlier, subsequent to the exposure of film strip 38, the emulsion side 40 is adapted to be coated with a liquid processing composition for developing latent images therein by a diffusion transfer process. For this purpose, cassette 10 is provided with a normally inoperative processing station formed by a processing fluid dispenser 70 supported by side wall 14 with its lower applicator end 72 located adjacent the path of travel of emulsion side 40 intermediate opening 22 and roller 52. Dispenser 70 includes a container having therein a supply of viscous developing fluid. The lower applicator end 72 includes an orifice which acts as a nozzle for feeding a doctor blade to supply a carefully measured thickness of the viscous film processing fluid to the emulsion side 40 of film strip 38. A rupturable membrane is provided across the orifice to render the dispenser inoperative. Dispenser 70 also includes a plunger 74 which is operable to apply pressure to the fluid within the container during the processing mode of operation. The pressure causes the membrane to rupture thereby permitting the fluid to flow through the orifice across the doctor blade for application to the film strip as it is transported past the doctor blade during its initial rewind onto supply reel 24. Such a processing system is described in U.S. Pat. No. 3,615,127.

Drying of the liquid coated film strip may be facilitated by blowing air through the cassette housing during processing and/or projection modes of operations. For this purpose, an air inlet 71 in side wall 14 and an air outlet 73 in peripheral 20 are provided to establish an air flow path therebetween across reels 24 and 26. Air inlet 71 is positioned near prismatic lens 56 and directs air from a blower mounted in the projector such that the air flows over a portion of the lens for simultaneously cooling the lens which tends to be heated by the projection lamp and heating the incoming air to enhance drying of the liquid treated film strip 38. Baffles 75 may be integrally formed with sidewalls 14 and 18 such that they cooperate to form light sealing and air distributing labyrinths between the air inlet 71, air outlet 73 and the reels 24 and 26. A detailed description of the air flow system may be found in copending application Ser. No. 214,638 filed on even date herewith by William A. Holmes et al.

Turning now to the construction of tension regulator 48, it may be seen from FIGS. 2–5 that the tension regulator includes a pivot arm 76 having an integrally formed roller bearing 78 near one end thereof, roller 50 rotatably mounted on roller bearing 78, a mounting bearing 80 integrally formed near the opposite end of pivot arm 76, and an integrally formed resilient blade 82 extending from mounting bearing 80 at an cute angle to pivot arm 76 towards roller bearing 78. One skilled in the art will recognize that pivot arm 76, bearings 78 and 80, and resilient blade 82 readily lend themselves to being incorporated into a unitary molded plastic structure. While any suitable high strength plastic may be used, it is preferable to employ a composite material such as glass filled Nylon because of the stress imposed on the tension regulator during the processing mode of operation.

As best shown in FIG. 2, pivot arm 76 is configured to include a relatively thick section 84 adjacent to mounting bearing 80 for stiffening pivot arm 78 to prevent torsional twisting thereof. Roller bearing 78 includes a cylindrical base section 88, a tapered intermediate section 90 configured to reduce in cross section until it meets a smaller cylindrical top section 92. As best shown in FIG. 5, the hub section 94 of roller 50 includes a bearing sleeve 96 generally conforming to the shape of roller bearing 78 for receiving the roller bearing to rotatably mount roller 50 on the end of pivot arm 76. It will be understood by those skilled in the art that roller bearing 78 and bearing sleeve 96 may also have other conforming shapes such as a cylinder, etc.

Pivot arm mounting bearing 80 may be formed to define a cylindrical sleeve 98 for receiving a cylindrical mounting post 100 which may be integrally formed with side wall 14 adjacent to supply reel 24.

As best shown in FIG. 2, resilient blade 82 is tapered to reduce in lateral cross section and one skilled in the art will appreciate that the function of the taper is to control the spring rate of the blade 82. When pivot arm 76 is mounted on post 100, the free end 102 of the blade bears against a first stop 104, which also may be integrally formed with side wall 14, thereby fixing the initial position of tension regulator 48.

As best shown in FIG. 1, when tension regulator is located in its initial position, roller 50 supports that portion of film strip 38 between supply reel 24 and idler or roller 52 in position to form a feed loop.

As the claw mechanism associated with the camera or projector engages the film strip at opening 22 and moves an incremental section from the feed loop into the exposure or projection station 64, the feed loop length decreases and the film strip deflects or pivots arm 76 in a clockwise direction (as viewed in FIG. 3) about mounting post 100 to an energized position shown in dotted lines. The clockwise pivoting action causes resilient blade 82 to bend or bow inwardly toward pivot arm 76 thereby storing energy in tension regulator 48 for its return from the energized position to the initial position. While the incremental section of film strip is held at station 64 for exposure or projection, the energy stored in blade 82 causes pivot arm 76 to pivot in a counterclockwise direction thereby causing roller 50 to replenish the feed loop by drawing a length of film strip from supply reel 24 as it returns to the initial position. Thus the tension regulator 48 serves to delay the rotation of supply reel 24 until an incremental section of the film strip has been moved into its position at station 64 thereby isolating that portion of the film strip near opening 22 from the inertial drag of supply reel 24. One skilled in the art will appreciate that such isolation serves to prevent tearing or deformation of the film strip sprocket holes 42 by the claw mechanisms and assures smooth transport of the film strip into the exposure or projection position.

As noted earlier, film strip 38 is processed or developed by activating the processing station and rapidly rewinding film strip 38 such that a thin uniform coating of liquid processing composition may be applied to emulsion side 40 at the application end 72 of dispenser 70. It is during this rapid rewind that tension within a film strip builds up to a maximum and causes maximum stress to be imposed on tension regulator 48. As best shown in FIGS. 2 and 4, a second stop 106 integrally formed with side wall 14 is provided below pivot arm 76 for limiting the path of travel of the pivot arm 76 thereby stabilizing the tension regulator in a terminal position (shown in dotted lines) beyond the energized position shown in FIG. 3. In addition to stabilizing pivot arm 76, stop 106 also relieves the strain on the inwardly bowed resilient blade 82 to prevent plastic deformation thereof. It will be noted that when pivot arm 76 is deflected to either the energized or terminal positions, the stress associated with bending resilient arm 82 is confined within pivot arm 76, mounting bearing 80 and blade 82 and is not transferred to mounting post 100. By minimizing the load on post 100 in this manner, it is possible to minimize the dimensions of post 100 and mounting bearing 80 and utilize a molded plastic structure for mounting tension regulator 48 on side wall 14.

Roller 50 may be molded of the same glass filled Nylon material as pivot arm 76 or some other suitable plastic material and is configured to include a recess 108 in the exterior surface of hub section 94. As mentioned earlier, in the preferred embodiment, film strip 38 is adapted to pass around roller 50 with its emulsion side 40 facing inwardly towards hub section 94. The function of recess 108 is to prevent contact between the liquid coating which is applied to the central portion of the film strip emulsion side 40 and the roller 50 as the tension regulator guides the film strip onto the supply reel during processing and subsequent rewind operations. Likewise, rollers 52 and 54 may be provided with a similar recess to prevent contact with the coating of liquid processing composition.

Roller 50 may also be provided with a protrusion 110 extending outwardly from its top surface which is adapted to bear against a third stop 112 integrally formed with cassette side wall 18 when tension regulator 48 is located at its terminal position. The purpose of protrusion 110 and stop 112 is to limit the torsional twisting of pivot arm 76 during rapid rewind thereby cooperating with the relatively thick pivot arm section 84 to relieve strain on roller bearing 78, mounting bearing 80 and mounting post 100.

As can be seen from FIG. 2, tension regulator 48 is ideally constructed for automated assembly and mounting. Assembly is accomplished simply by inserting roller bearing 78 into roller bearing sleeve 96. Once assembled, the tension regulator may be mounted in cassette 10 by coupling mounting bearing 80 to mounting post 100 such that the free end 102 of blade 82 bears against stop 104.

In operation, cassette 10 is mounted in a motion picture camera for exposing film strip 38. Image bearing light provided by the camera lens is directed through opening 22 onto film strip 38 as the claw mechanism progressively transports incremental sections of the film strip from the feed loop past exposure station 64 towards take-up reel 26 which is driven in a counterclockwise direction to collect the advancing film strip. In response to a length of film strip being transported from the feed loop toward station 64 tension regulator 48 moves from its initial position to its energized position and then back to its initial position thereby replenishing the feed loop from supply reel 24. This operating cycle continues as another length of film strip is moved towards station 64 such that tension regulator 48 reciprocates between the initial and energized positions for continuously forming a feed loop between supply reel 24 and opening 22. Thus tension regulator 48 is configured for reciprocating movement between an initial position and an energized position in response to progressively transporting the film strip in a first direction, i.e., from the supply reel 24, past station 64, towards take-up reel 26.

After exposure, the cassette 10 may be immediately transferred to a projector for film processing and projection. During the processing mode of operation, film strip 38 is rapidly transported from the take-up reel 26 past the activated dispenser 70 for coating and is then guided onto supply reel 24 by roller 50. By rapidly transporting the film strip in a second direction, i.e., towards supply reel 24, tension regulator 48 moves from its initial position to its terminal position where stop 106 stabilizes pivot arm 76 such that roller 50 rotates at a fixed position (See FIG. 4) and does not oscillate which may cause the coating an emulsion side 40 to be disturbed. Thus cassette 10 is provided with a tension regulator 48 which is configured for movement from an initial position to a terminal position in response to progressively transporting the film strip in a second direction for stabilizing the tension regulator 48 to insure that the liquid coating on the film strip is not disturbed as the tension regulator 48 guides the film strip onto the supply reel 24.

Simultaneously with applying the liquid processing composition to film strip emulsion side 40, air may be blown through air inlet 71 to enhance drying.

Development of the film strip 38 is completed in a relatively short time such that the film strip may be advanced almost immediately from supply reel 24 past projection station 64 for projection. As incremental sections of the developed film strip are progressively transported to the projection position, prismatic lens 56 directs light rays from a projection lamp associated with the projector towards and through the film strip and then outwardly through opening 22 such that the light rays may be projected onto a viewing screen.

An example of a projector suitable for use with film handling cassette 10 may be found in the copending application of Edwin H. Land, Ser. No. 174,375, filed on Aug. 24, 1971, and assigned to the same assignee as the present invention.

As during the exposure mode of operation, tension regulator 48 reciprocates between its initial and energized position in response to progressively transporting film strip 38 in the first direction for projection thereby continuously forming the feed loop of film strip 38 intermediate the supply reel 24 and opening 22 for isolating that portion of the film strip near opening 22 from the inertial drag of supply reel 24.

Idler 54 may be configured such that its rotation may be selectively arrested during exposure and projection modes of operation, respectively, by suitable elements in the camera and projector to provide "snubbing action." Also, it will be understood that in other embodiments of this invention employing a different location for dispenser 70, or possibly a more compact dispenser located between supply reel 24 and opening 22, tension regulator 48 may be positioned near the corner of cassette housing 12 occupied by roller 52.

In summary, a multi-purpose film handling cassette has been provided which includes a compact tension regulator that lends itself to molded plastic construction and automated assembly and mounting within the cassette housing. The tension regulator includes a pivot arm having an integrally formed roller bearing, a roller, an integrally formed mounting bearing, and an integrally formed resilient blade for biasing the regulator toward its initial position. During exposure and projection operations the tension regulator is responsive to film movement in a first direction for establishing a feed loop of film strip by moving between initial and energized positions. In response to moving the film strip in a second direction during a processing mode of operation, the tension regulator is configured to move from the initial position beyond the energized position to a terminal position where the tension regulator is stabilized and may guide the film strip onto a supply reel without disturbing a coating of liquid processing composition on the film strip.

Since certain changes may be made in the above apparatus without departing from the scope of the invention herein involved, it is intended that all matter contained in the above description or shown in the accompanying drawings shall be interpreted as illustrative and not in a limiting sense.

What is claimed is:

1. A film handling cassette adapted for use with a motion picture camera and/or projector of the type including film transport means for facilitating film exposure or projection operations, said cassette comprising:
   a housing;
   a reel rotatably mounted within said housing;
   a length of photographic film strip stored on said reel;
   means for providing access for light rays to be directed toward an incremental section of said film strip as said film strip is progressively transported past said access means to facilitate film exposure or projection operations; and
   tension regulating means movable between an initial position and an energized position in response to progressively transporting said film strip past said access means for establishing a feed loop of film strip intermediate said reel and said access means to isolate that portion of said film strip near said access means from the inertial drag of said reel, said tension regulating means including a roller around which said film strip is adapted to pass, an arm for supporting said roller, an integrally formed roller bearing near one end of said arm for rotatably mounting said roller, a mounting bearing integrally formed near the opposite end of said arm for coupling said arm to said cassette housing for movement between said initial and energized positions and biasing means including a resilient blade integrally formed with said arm and extending from said mounting bearing at an acute angle to said arm towards said roller bearing for biasing said arm towards said initial position.

2. A film handling cassette as defined in claim 1 wherein said housing further includes a mounting post to which said mounting bearing may be coupled and first stop means against which said resilient blade may be positioned to locate said tension regulating means in said initial position.

3. A film handling cassette adapted for use with a motion picture camera and/or projector of the type including film transport means for facilitating film exposure or projection operations, said cassette comprising:
   a housing;
   a reel rotatably mounted within said housing;
   a length of photographic film strip stored on said reel;
   means for providing access for light rays to be directed towards an incremental section of said film strip as said film strip is progressively transported past said access means to facilitate film exposure or projection operations;
   tension regulating means movable between an initial position and an energized position in response to progressively transporting said film strip past said access means for establishing a feed loop of film strip intermediate said reel and said access means to isolate that portion of said film strip near said access means from the inertial drag of said reel, said tension regulating means including a roller around which said film strip is adapted to pass, an arm for supporting said roller, and means integrally formed with said arm for biasing said arm towards said initial position; and
   a processing station past which film strip may be progressively transported toward said reel for coating said film strip with a liquid processing composition;
   said tension regulating means being configured for movement from said initial position to a stabilized terminal position in respone to progressively transporting said film strip past said processing station for guiding said film strip onto said reel without disturbing said coating of liquid processing composition on said film strip.

4. A film handling cassette as defined in claim 3 wherein said housing further includes stop means against which said arm may be positioned for locating said tension regulating means in said stabilized terminal position.

5. A film handling cassette as defined in claim 4 wherein said arm includes a relatively thick section for stiffening said arm to prevent torsional twisting thereof as said tension regulating means guides said film strip onto said reel.

6. A film handling cassette as defined in claim 4 wherein said roller includes a protrusion and said housing includes a stop against which said protrusion may be positioned when said tension regulating means is located in said stabilized terminal position for preventing torsional twisting of said arm as said tension regulating means guides said film strip onto said reel.

7. A film handling cassette for use with a motion picture camera and projector of the type including film transport means for facilitating film exposure, processing, and projection operations, said cassette comprising:
   a housing;
   a reel rotatably mounted within said housing;
   a length of photographic film strip stored on said reel;
   means for providing access for light rays to be directed toward an incremental section of said film strip as said film strip is progressively transported past said access means in a first direction to facilitate film exposure and projection operations;
   a processing station past which said film strip may be progressively transported in a second direction for coating said film strip with a liquid processing composition; and
   tension regulating means configured for reciprocating movement between an initial position and an energized position in response to progressively transporting said film strip in said first direction for continuously forming a feed loop of film strip intermediate said reel and said access means to isolate that portion of said film strip near said access means from the inertial drag of said reel, said tension regulating means also being configured for movement from said initial position to a terminal position in response to progressively transporting said film strip in said second direction for stabilizing said tension regulating means to insure that said liquid coating on said film strip is not disturbed as said tension regulating means guides said film strip onto said reel.

8. A film handling cassette as defined in claim 7 wherein said energized position is intermediate said initial position and said terminal position.

9. A film handling cassette as defined in claim 7 wherein said tension regulating means is configured for pivotal movement between said initial, energized, and terminal positions.

10. A film handling cassette as defined in claim 7 wherein said tension regulating means is positioned intermediate said reel and said access means and said tension regulating means includes a roller around which said film strip is adapted to pass such that said roller establishes in part a path of travel for said film strip through said housing.

11. A film handling cassette as defined in claim 10 further including a second roller intermediate said tension regulating means roller and said access means for establishing another part of a path of travel for said film strip through said housing.

12. A film handling cassette as defined in claim 11 further including a second reel onto which said film strip may be wound subsequent to being progressively transported past said access means in said first direction and a third roller intermediate said access means and said second reel for establishing a path of travel for said film strip onto said second reel.

13. A film handling cassette as defined in claim 7 wherein said tension regulating means includes a pivot arm having an integrally formed roller bearing near one end thereof, a roller rotatably mounted on said roller bearing and around which said film strip is adapted to pass, a mounting bearing integrally formed near the opposite end of said pivot arm for coupling said arm to said housing, and an integrally formed resilient blade extending from said mounting bearing at an acute angle to said pivot arm toward said roller bearing for biasing said pivot arm towards said initial position.

14. A film handling cassette as defined in claim 13 wherein said mounting bearing includes a cylindrical sleeve and said housing further includes a cylindrical post for receiving said cylindrical sleeve for pivotally coupling said pivot arm to said housing for pivotal movement between said initial, energized, and terminal positions.

15. A film handling cassette as defined in claim 14 wherein said housing further includes first stop means against which said resilient blade may be positioned for locating said tension regulating means in said initial position and second stop means against which said pivot arm may be positioned in response to progressively transporting said film strip in said second direction for locating said tension regulating means in said stabilized terminal position.

16. A film handling cassette as defined in claim 13 wherein said roller includes a recess for preventing contact between said liquid coating on said film strip and said roller.

17. A film handling cassette as defined in claim 13 wherein said pivot arm is moved from said initial position to said energized position in response to an incremental section of film strip being transported from said feed loop to said access means in said first direction thereby causing said resilient blade to bend and provide stored energy for returning said pivot arm to said initial position for replenishing said feed loop by drawing a length of film strip from said reel.

18. A film handling cassette adapted for use with a motion picture camera and projector of the type including film transport means for facilitating film exposure, processing, and projection operations, said cassette comprising:
a housing including a pair of side walls spaced in parallel relation by a peripheral wall;
a supply reel and take-up reel rotatably mounted in coplanar relation within said housing with their respective axes of rotation substantially normal to said pair of side walls;
a length of photograhic film strip having one end attached to said supply reel and the opposite end thereof attached to said take-up reel;
means for providing access at said peripheral wall for light rays to be directed towards an incremental section of said film strip as said film strip is progressively transported past said access means from said supply reel towards said take-up reel to facilitate film exposure and projection operations;
a processing station for coating said film strip with a liquid processing composition as said film strip is progressively transported past said processing station from said take-up reel towards said supply reel;
tension regulating means for establishing a feed loop of film strip intermediate said supply reel and said access means to isolate that portion of said film strip near said access means from the inertial drag of said supply reel during film exposure and projection operations and for guiding said film strip onto said supply reel during film processing operations, said tension regulating means including a pivot arm having an integrally formed roller bearing near one end, a roller mounted on said roller bearing, an integrally formed mounting bearing near the opposite end of said pivot arm, and an integrally formed resilient blade extending from said mounting bearing at an acute angle to said pivot arm towards said roller bearing;
means for coupling said tension regulating means to one of said pair of side walls intermediate said supply reel and said access means including a post integrally formed with said one side wall for receiving said pivot arm mounting bearing and first stop means integrally formed with said one side wall against which said resilient blade is positioned for locating said tension regulating means in an initial position wherein said roller supports a portion of said film strip in position to form the feed loop, said resilient blade being configured to permit said pivot arm to move from said initial position to an energized position in response to a length of said film strip being transported from said feed loop to said access means and thereafter causing said pivot arm to return to said initial position thereby causing said roller to replenish the feed loop by drawing a length of film strip from said supply reel; and second stop means integrally formed with said one side wall against which said pivoted arm is adapted to be positioned for locating said tension regulating means in a stabilized terminal position as said film strip is progressively transported past said processing station towards said supply reel such that said roller may guide said liquid coated film strip onto said supply reel without disturbing the coating.

19. A film handling cassette as defined in claim 18 wherein said roller includes a recess for preventing contact between said liquid coating on said film strip and said roller.

20. A film handling cassette as defined in claim 18 wherein said roller includes a protrusion and said housing further includes third stop means integrally formed with one of said side walls against which said protrusion may be positioned when said tension regulating means is located in said stabilized terminal position to prevent torsional twisting of said pivot arm.

21. A film handling cassette as defined in claim 18 wherein said pivot arm includes a relatively thick section near said mounting bearing for stiffening said pivot arm to prevent torsional twisting thereof as said roller guides said film strip onto said supply reel.

22. A film handling cassette as defined in claim 18 wherein said tension regulating means is configured for reciprocating movement between said initial and terminal positions in response to progressively transporting incremental sections of said film strip past said access means towards said take-up reel for continuously forming the feed loop during exposure and projection modes of operation.

23. A film handling cassette as defined in claim 18 wherein said tension regulating roller is positioned near a first corner of said housing intermediate said supply reel and said access means and said cassette further includes a second roller positioned near the next successive corner of said housing intermediate said tension regulating roller and said access means and a third roller positioned near the next successive corner of said housing intermediate said access means and said take-up reel, said film strip being adapted to pass around said three rollers such that they cooperate to provide means for establishing a path of travel for said film strip between said supply reel, said access means, said processing station and said take-up reel.

24. A film handling cassette as defined in claim 23 wherein one of said second and third idlers is configured to have its rotation selectively arrested during exposure and projection modes of operation to provide snubbing action.

25. A film handling cassette as defined in claim 24 wherein said third roller is configured to have its rotation selectively arrested during exposure and projection modes of operation to provide snubbing action.

26. A film strip tension regulating device adapted to be operatively associated with a photograhic film strip to facilitate film exposure and projection operations, said tension regulating device comprising:
 a roller around which the film strip is adapted to be progressively advanced during exposure and projection operations;
 an arm for rotatably mounting said roller, said arm being adapted to be mounted for movement between initial and energized positions in response to progressively advancing the film strip around said roller, said arm further including an integrally formed roller bearing near one end thereof for rotatably mounting said roller thereon and an integrally formed mounting bearing near the opposite end thereof which is adapted to be coupled to external mounting means for mounting said arm for movement between said initial and energized positions; and
 means integrally formed with said arm for biasing said arm towards its initial position, said biasing means including an integrally formed resilient blade extending from said mounting bearing at an acute angle to said arm towards said roller for reducing the strain on the external mounting means when said arm is located in a position other than said initial position.

27. A film strip tension regulating device adapted to be operatively associated with a photographic film strip to facilitate film exposure, projection, and processing operations, said tension regulating device comprising:
 a roller around which the film strip is adapted to be progressively advanced during exposure, projection, and processing operations;
 an arm for rotatably mounting said roller, said arm being adapted to be mounted for movement between initial and energized positions in response to progressively advancing the film strip around said roller during exposure and projecting operations, and being adapted to be mounted for movement from said initial position past said energized position towards a terminal position in response to progressively advancing the film strip around said roller during film processing operations wherein the film strip is treated with a processing composition; and
 means integrally formed with said arm for biasing said arm towards its initial position.

28. A film strip tension regulating device as defined in claim 27 wherein said arm includes a portion which is adapted to bear against an external stop for stabilizing said arm at said terminal position.

29. A film handling cassette including a film strip tension regulating system adapted to be engaged by a film strip within said cassette to exert a first maximum amount of force thereon during first film handling operations in which the film strip is progressively advanced therepast and a second amount of force greater than said first maximum amount of force during second film handling operations in which the film strip is progressively advanced therepast, said cassette and tension regulating system comprising:
 a cassette housing;
 a roller positioned within said cassette housing to support the film strip during progressive advancement thereof;
 means within said cassette housing for rotatably mounting said roller for displacement parallel to its axis between an initial position and a second position responsive to said first maximum amount of force being exerted by the film strip and from said initial position beyond said second position towards a third position responsive to said second amount of force being exerted thereon, said mounting means including means for continually urging said roller towards its said initial position whenever it is displaced away therefrom towards its said second or third positions; and means within said cassette housing interposed between said second and third positions of said roller for restraining further movement of said roller towards the third position whenever said second amount of force is exerted thereon whereby movement of said roller in a direction parallel to its axis is stabilized at such times.

30. The cassette of claim 29 wherein the first film handling operation includes an exposure or projection operation and the second film handling operation includes the application of a processing composition to the film strip.

31. A film handling cassette including a film strip tension regulating system adapted to be engaged by a film strip within said cassette to exert a first maximum amount of force thereon during first film handling operations in which the film strip is progressively advanced therepast and a second amount of force greater than said first maximum amount of force during second film handling operations in which the film strip is progressively advanced therepast, said cassette and tension regulating system comprising:

a cassette housing;

means positioned within said cassette housing to support the film strip during progressive advancement thereof;

means within said cassette housing for mounting said film support means for displacement between an initial position and a second position responsive to said first maximum amount of force being exerted by the film strip and from said initial position beyond said second position towards a third position responsive to said second amount of force being exerted thereon, said mounting means including means for continually urging said film support means towards its initial position whenever it is displaced away therefrom towards its said second or third positions; and means within said cassette housing interposed between said second and third positions of said film support means for restraining further movement of said film support means towards the third position whenever said second amount of force is exerted thereon whereby movement of said film support means is stabilized at such times.

32. A film handling cassette for retaining a supply of film strip and configured for use with photographic apparatus of the type including actuating means for effecting the advancement of the film strip intermittently along a given path within said cassette during first film handling operations and for effecting the advancement of the film strip substantially continuously along said given path within said cassette during second film handling operations, the actuating means of the apparatus including a member adapted to engage the film strip at a given position during the first film handling operations to impart an intermittent motion thereto, said cassette comprising a housing, means for storing a supply of the film strip within said housing and a film strip tension regulating system, said system including film support means for engaging and supporting a portion of the film strip intermediate said film strip storing means and the position at which the apparatus member is adapted to engage the film strip as the film strip is advanced relative to said film support means along said given path during both the first and second film handling operations, means for mounting said film support means for movement as the film strip is being advanced intermittently relative to said support means during the first film handling operations so as to intermittently form a feed loop of the film strip intermidiate said film strip storing means and the position of engagement of the apparatus member with the film strip to intermittently substantially isolate a portion of the film strip disposed on the apparatus member side of said film support means from inertial forces associated with portions of the film strip on the other side of said film support means, and means within said cassette housing for stabilizing said moveably mounted support means responsive to the film strip being advanced relative to said moveably mounted support means during the second film handling operations such that said moveably mounted support means supports the film strip in a stabilized manner at such times.

33. The cassette of claim 32 wherein the second film handling operation includes processing of the film strip and said cassette further includes processing means for treating the film strip with a liquid processing composition.

* * * * *